A. C. HULBERT.
FLUID PRESSURE GAGE AND AUTOMATIC REGULATOR.
APPLICATION FILED DEC. 27, 1912.
1,069,066.
Patented July 29, 1913.
2 SHEETS—SHEET 1.
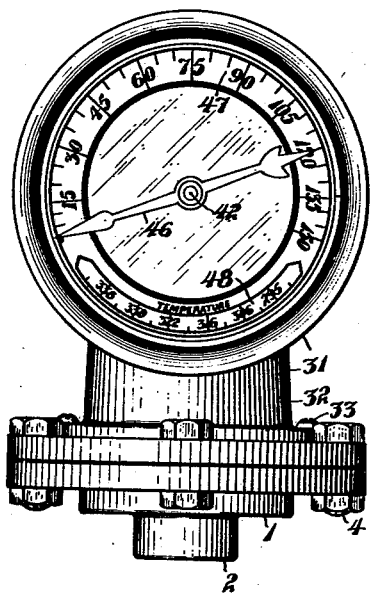
Fig.1.
Fig.2.
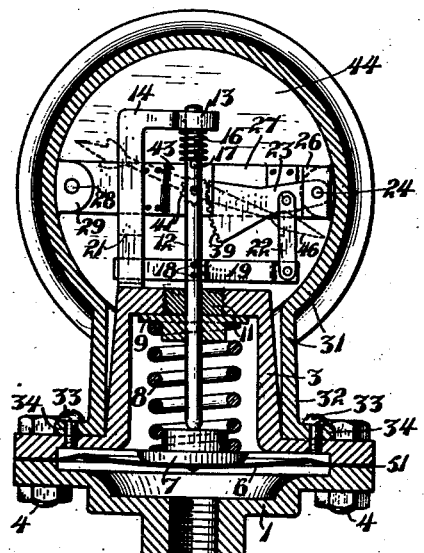
Fig.3.
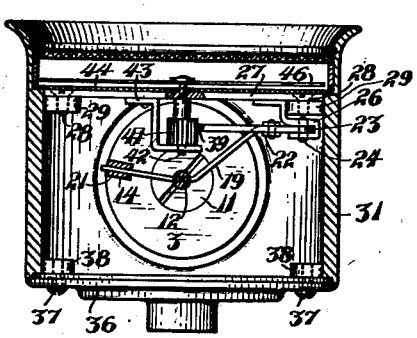
Fig.4.
Fig.5.
Fig.6.
WITNESSES
INVENTOR
Ansel C. Hulbert
BY
Francis M. Wright
ATTORNEY A. C. HULBERT.
FLUID PRESSURE GAGE AND AUTOMATIC REGULATOR.
APPLICATION FILED DEC. 27, 1912.
1,069,066.
Patented July 29, 1913.
2 SHEETS—SHEET 2.
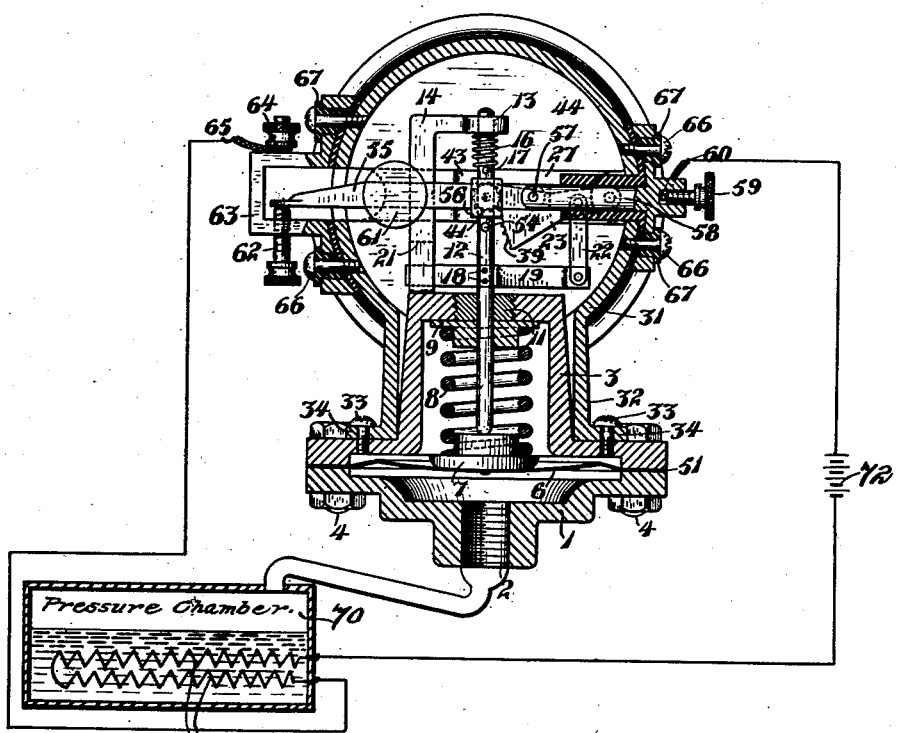
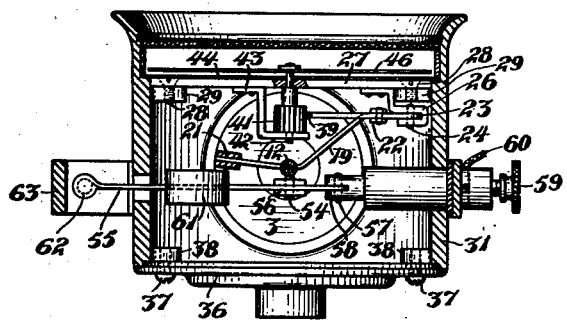
WITNESSES
INVENTOR
Ansel C. Hulbert
BY
Francis M. Wright
ATTORNEY

UNITED STATES PATENT OFFICE.

ANSEL C. HULBERT, OF SAN FRANCISCO, CALIFORNIA.

FLUID-PRESSURE GAGE AND AUTOMATIC REGULATOR.

1,069,066.  Specification of Letters Patent.  Patented July 29, 1913.

Application filed December 27, 1912. Serial No. 738,792.

*To all whom it may concern:*

Be it known that I, ANSEL C. HULBERT, a citizen of the United States, residing at San Francisco, in the county of San Francisco and State of California, have invented new and useful Improvements in Fluid-Pressure Gages and Automatic Regulators, of which the following is a specification.

One object of the present invention is to provide a fluid pressure gage which will be accurate, compact in form, simple in construction, and not liable to get out of order.

A further object is to provide such a gage which will also act as an automatic regulator for maintaining the fluid pressure constant.

In the accompanying drawing, Figure 1 is a front view of the pressure gage; Fig. 2 is a vertical section thereof viewed from the rear, certain parts being shown in side elevation; Fig. 3 is a horizontal section thereof; Figs. 4, 5 and 6 are sectional views of a diaphragm thereof in different positions; Fig. 7 is a view similar to Fig. 2 of the gage when used as an automatic regulator; Fig. 8 is a view of the same similar to Fig. 3.

Referring to the drawing, 1 indicates a pressure chamber casing formed with a depending central internally threaded apertured boss 2, adapted to be screwed on to the end of a pipe connected with a source of supply of pressure fluid, such as steam, and 3 indicates a spring casing, the casings 1 and 3, constituting a two-part housing for the diaphragm. Between circular flange portions of said casings is clamped, by bolts 4, a marginal portion of a diaphragm 6, the construction of which will be hereafter more specifically described, and which diaphragm forms a fluid-tight closure for the pressure chamber. Centrally riveted to said diaphragm on the upper side thereof is a bearing-block 7 forming a lower seat for a coiled spring 8, the upper end of which abuts against an upper seat 9 in the top of said spring casing. Into a central threaded hole in said top is screwed a plug 11, the under surface of which contacts with said upper seat 9, so that by screwing said plug in or out, the spring can be more or less compressed, and its pressure varied as desired. To transmit a vertical motion of said diaphragm, due to a change in the fluid pressure, there is provided a rod 12 constituting an actuating member, the lower end of which bears upon said lower seat 7, and which passes through central apertures in said upper seat and plug, and the upper portion of which passes through a guideway 13 formed in an arm 14 extending upwardly from a spring casing, said rod being maintained in contact with said lower seat by a coiled spring 16 surrounding the rod, and compressed between said bearing and a transverse pin 17 through said rod. The actuating member is therefore yieldingly held in contact with the diaphragm during all vibrations thereof. To said rod is rigidly secured as shown at 18, a cross arm 19, of which one end is guided in a vertical slot 21 formed in the arm 14, while the other end is pivotally secured to the lower end of a link 22, the upper end of which is pivotally connected to a lever 23. Said lever is fulcrumed, as shown at 24, in a bracket 26, rigidly secured to a cross bar 27, secured by screws 28 to lugs 29 formed integral with, and extending inwardly from, the cylindrical wall of a gage casing 31, said casing having a depending portion 32 surrounding the spring casing, and secured by screws 33 passing through flanges 34 to the flange portion of said spring casing. A rear circular wall 36, Fig. 3 of said gage casing is secured thereto by means of screws 37 screwed into lugs 38 formed integral with said casing. The free end of said lever is formed with a segment gear 39, which meshes with a pinion 41 on a shaft 42 having a front bearing in the cross bar 27, and a rear bearing in a bracket 43 secured to, and extending rearwardly from, said cross bar, said shaft passing through a dial plate 44 having secured thereon on the end thereof the center of a pointer 46 rotating in front of said dial plate. When used to indicate the pressure of steam, said dial has thereon preferably two circular indicating scales, one 47 to indicate the pressure in pounds to the square inch, and the other 48 to indicate the temperature in degrees. These two series are so arranged that, while one end of the pointer travels over the pressure scale 47, the other end travels over the temperature scale 48. This arrangement is very useful when the steam is used for cooking, vulcanizing, or other purposes in which a knowledge of the exact temperature is important. The extent of the temperature scale will correspond to the limits of temperature within which it is desired to use the apparatus. It is here shown as ranging between about 290° F. and 340° F.

The mode of operation of the device will be readily understood from the foregoing description. As the fluid pressure increases, the rod 12 is raised rocking the lever 23 and correspondingly rotating the pinion 41, and moving the pointer over the indicating dial.

A very important feature of my invention resides in the construction of the diaphragm, whereby I am enabled to obtain a large amplitude of transverse movement of a diaphragm of comparatively small diameter. Said diaphragm comprises a flange portion 51 secured between the casings 1 and 3, a short conical portion 52 within said flange portion, and, within said conical portion a concavo-convex central portion 53. If the fluid pressure is at its maximum value, then the diaphragm will be in the position illustrated in Fig. 4. As the fluid pressure decreases, so that the pressure of the spring depresses the diaphragm, the concavo-convex central portion is moved from the position shown in Fig. 4 to the position shown in Fig. 5, while the conical portion 52, does not materially change its position. But, as the fluid pressure still further decreases, no appreciable change takes place in the formation of the concavo-convex central portion 53, but the conical portion 52 approaches a flattened condition, its inner edge, and the outer edge of the concavo, convex portion, contracting. This double curvature of the diaphragm permits of a much greater amplitude of transverse movement of the center of the diaphragm than one in which the curvature is single.

In the modification shown in Figs. 7 and 8, there extends through the rod 12 a pin 54, which, as the rod rises to any desired height, that is, when the pressure is of any desired degree, engages an insulating block 56 carried by a lever 55 pivoted at 57 upon a casting 58, to which may be attached by a binding screw 59 one side 60 of an electric circuit. Said lever carries a weight 61, and its end can rest upon a contact screw 62 screwed through a bracket 63, carrying a binding screw 64 to which the other side 65 of said circuit can be attached. The bracket 63 and casting 58 are secured by screws 66 to opposite sides of the gage casing, but insulated therefrom by insulating material 67. When the fluid pressure rises beyond a predetermined degree, the lever is raised from off the contact screw 62 and the circuit is broken, and the circuit closes again when the pressure again falls below said degree. By this means, therefore, the fluid pressure can be automatically regulated very accurately, since the electric circuit can be used to control said pressure, the pressure increasing when the circuit is closed and decreasing when it is broken. For the purpose of illustrating a system in which the circuit controller regulates the fluid pressure, I have shown conventionally a steam generator 70 in which the steam is generated by an electric heater 71, which is in circuit with an electric generator 72, and connected to the circuit controller of the pressure gage. The contact 62 is adjusted so that the lever will be lifted to break the circuit at the desired pressure. As soon as the critical fluid pressure is reached the circuit will be broken at the contact 62, thereby cutting out the electric heater and preventing a further rise in pressure. As soon as the pressure decreases the lever 55 will again close the circuit at 62, bringing the electric heater into operation, so that the pressure gage automatically controls the fluid pressure of the system. The lever-arm 55 projects outside of the casing and the coöperating contact stud 62, is also located outside of the casing in an open frame 63. Now as these parts are adjusted so that the arm 55 is lifted from the stud 62 at the instant the fluid pressure reaches its maximum predetermined limit, it is apparent that the projecting arm 55 constitutes a maximum - pressure indicator and a glance at the position of the arm 55 will show whether the fluid pressure of the system has reached the maximum limit or whether it is below the maximum. Inasmuch as the arm 55 is operated by the same actuating member as the dial pointer, the indication of the maximum limit is exceedingly sensitive and accurate.

It is well known that the ordinary pressure gage, in which a Bourdon, or C spring, is used, does not retain its accuracy for any great length of time; also that when such spring is used to operate an electric circuit breaker, the pressure surface operating the gage is so small that the necessary power is sometimes lacking. With this invention the surface exposed to pressure and operating the gage is considerable.

By my invention I am enabled to provide a pressure gage of extreme accuracy, the base of which has a diameter of not more than two and one-half inches, a result never before attained, or even approximated, so far as I am aware, the smallest diameter of a diaphragm gage heretofore put upon the market being one having a base of at least twice the diameter. This result I attain by the following three improvements:

1. The peculiar form of the diaphragm, comprising the conical portion 52 making an angle of about twenty-five degrees with the flange 51, and the central portion 53, which may be either concave or convex. This conical portion 52 permits of the portion 53, as shown in Fig. 5, being still further depressed to the position shown in Fig. 6. Thus I obtain a diaphragm of great amplitude of movement for a given diameter.

2. With my construction the spring 8 is allowed to expand to its full extent in the position in which there is no pressure upon the under side of the diaphragm. In prior devices as for instance in the patent to Craig, No. 908,206 the normal position of the diaphragm has been level, being prevented from expanding by a stop arresting its downward movement. In my invention the diaphragm starts at the lowermost point and rises as the pressure gradually increases.

3. The stem 12 is not positively connected to the seat 7, but merely rests thereon. It is not possible to obtain a diaphragm of absolutely equal strength on all sides. Consequently if the stem 12 were positively connected to the seat 7, there would be a tendency to sidewise movement of said stem, owing to the diaphragm being weaker on one side than on another. This would cause the stem to bind in its bearing. By the construction in which the stem merely rests upon the seat, this result is avoided.

I am aware that it has been proposed to use both pressure and temperature scales with the same pointer, but heretofore, so far as I am aware, these scales have extended in two concentric circles having the same angular relation to the pointer. When such is the case it is not possible to prevent the readings of the smaller circle being obstructed by the pointer. In my invention in which they extend opposite to one another the readings are never obstructed.

I claim:—

1. A pressure gage, comprising a diaphragm having a central concavo-convex portion terminating in an outwardly inclined annular portion extending in the same general direction as the concavo-convex portion upon one side of the plane of the diaphragm and a flat marginal rim adjacent said inclined portion and a casing surrounding said diaphragm having clamping means for engaging said marginal rim.

2. A pressure gage, comprising a diaphragm having its margin restrained and its central portion free to move under the influence of fluid pressure acting against one side thereof, a spring normally maintaining a tension upon the other side of the diaphragm, a device for indicating variations of pressure, an actuating member operatively connected to said indicating device and having one end loosely engaging said diaphragm upon the side of the tension member, and means for adjusting the tension of said spring independently of said actuating member.

3. A pressure gage, comprising a diaphragm having its margin restrained and its central portion free to move under the influence of fluid pressure acting against one side thereof, an adjustable tension device engaging the opposite side of the diaphragm, an indicating device, an actuating member operatively connected to said indicating device and bearing loosely upon the diaphragm upon the side of the tension member, yielding means acting directly upon said actuating member and tending to maintain said member in contact with the diaphragm in all positions thereof and return the indicating device to zero position when the fluid pressure is removed, and means for adjusting said tension device independently of said actuating member.

4. A pressure gage, comprising a housing, a diaphragm within the housing and having its marginal rim clamped therein, a bearing-block carried by said diaphragm, an adjustable spring engaging said block, means for adjusting the tension of said spring, an indicating device, and a spring-pressed stem or rod operatively connected with said indicating device and having one end bearing loosely upon said bearing-block.

In testimony whereof I have hereunto set my hand in the presence of two subscribing witnesses.

ANSEL C. HULBERT.

Witnesses:
F. M. WRIGHT,
D. B. RICHARDS.